US008878957B2

(12) United States Patent
Zhang (10) Patent No.: US 8,878,957 B2
(45) Date of Patent: Nov. 4, 2014

(54) METHOD, SYSTEM AND COMPUTER PROGRAM PRODUCT FOR ENHANCING WHITE BALANCE OF AN IMAGE

(71) Applicant: Texas Instruments Incorporated, Dallas, TX (US)

(72) Inventor: Buyue Zhang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 36 days.

(21) Appl. No.: 13/865,807

(22) Filed: Apr. 18, 2013

(65) Prior Publication Data
US 2013/0278792 A1    Oct. 24, 2013

Related U.S. Application Data

(60) Provisional application No. 61/625,927, filed on Apr. 18, 2012.

(51) Int. Cl.
*H04N 9/73*    (2006.01)

(52) U.S. Cl.
CPC ..................................... *H04N 9/735* (2013.01)
USPC ..................................... 348/223.1; 348/226.1

(58) Field of Classification Search
CPC ....... H04N 9/735; H04N 9/73; H04N 1/6086; H04N 5/2357
USPC ................. 348/223.1, 225.1, 226.1
See application file for complete search history.

(56) References Cited

U.S. PATENT DOCUMENTS

| | | | | |
|---|---|---|---|---|
| 5,691,772 A | * | 11/1997 | Suzuki | 348/223.1 |
| 6,075,563 A | * | 6/2000 | Hung | 348/223.1 |
| 7,714,902 B2 | * | 5/2010 | Yuyama | 348/223.1 |
| 2006/0177127 A1 | * | 8/2006 | Sachs et al. | 382/167 |
| 2006/0221205 A1 | * | 10/2006 | Nakajima et al. | 348/226.1 |
| 2007/0040927 A1 | * | 2/2007 | Ishigami et al. | 348/348 |
| 2010/0008573 A1 | * | 1/2010 | Tajbakhsh et al. | 382/167 |
| 2010/0020193 A1 | * | 1/2010 | Zhang et al. | 348/223.1 |
| 2011/0205389 A1 | * | 8/2011 | Zhang | 348/223.1 |
| 2011/0279703 A1 | * | 11/2011 | Lee | 348/223.1 |

OTHER PUBLICATIONS

Poplin, D., "An Automatic Flicker Detection Method for Embedded Camera Systems", IEEE: Transactions on Consumer Electronics, May 2006, pp. 308-311, vol. 52, No. 2, IEEE, Corvallis, OR, USA.

* cited by examiner

*Primary Examiner* — John Villecco
(74) *Attorney, Agent, or Firm* — Michael A. Davis, Jr.; Frederick J. Telecky, Jr.

(57) ABSTRACT

In response to an image, a likelihood of flicker within the image is estimated. In response to the estimated likelihood, references are selected from among first and second sets of references. The first set of references are responsive to a first set of reference images captured under particular illumination. The second set of references are responsive to a second set of reference images captured under fluorescent illumination. In response to the selected references, one or more gains are generated for enhancing white balance of the image.

24 Claims, 5 Drawing Sheets

METHOD, SYSTEM AND COMPUTER PROGRAM PRODUCT FOR ENHANCING WHITE BALANCE OF AN IMAGE

CROSS-REFERENCE TO RELATED APPLICATION

This application claims priority to U.S. Provisional Patent Application Ser. No. 61/625,927, filed Apr. 18, 2012, entitled ENHANCED AUTO WHITE BALANCE WITH FLUORESCENT ILLUMINATION DETECTION, naming Buyue Zhang as inventor, which is hereby fully incorporated herein by reference for all purposes.

BACKGROUND

The disclosures herein relate in general to image processing, and in particular to a method, system and computer program product for enhancing white balance of an image.

In a digital image, unrealistic color may be caused by a color of illumination under which the digital image was captured by a camera. A human's eyes can naturally adapt to the color of illumination, so that white continues appearing white to the human. However, the camera may fail to automatically adapt in the same way as the human's eyes.

Automatic white balance ("AWB") adjusts the digital image to help compensate for the color of illumination by removing unrealistic color from the digital image. Nevertheless, fluorescent illumination (e.g., in some indoor environments) presents a challenge to AWB, because fluorescent illumination may fail to obey a parametric model of standard reference images that are captured by the camera under a variety of standard illumination (e.g., incandescent, natural daylight and/or simulated daylight), such as scientific light bulbs for U30 (3000K), TL84 (4000K), D50 (5000K), D65 (6500K) and D75 (7500K). Those scientific light tubes have a Color Rendering Index ("CRI") near 100, and they closely resemble International Commission on Illumination ("CIE") standard illuminants. By comparison, in offices and homes, commonly used fluorescent lights have a relatively low-to-medium CRI that typically ranges from 60 to 85, so the standard reference set's TL84 fluorescent reference could be insufficient for rendering of images that are captured by the camera in various indoor environments.

Accordingly, to help improve AWB, fluorescent reference images may be captured by the camera under a variety of fluorescent illumination. Unfortunately, the fluorescent reference images may overlap (in a chromaticity space) with the digital image's non-neutral object colors under outdoor shade or outdoor sunny illumination. This problem is especially pronounced for green color.

To partially address this problem, the camera's exposure setting may be useful to help weight the various references in AWB's adjustment of the digital image, so that: (a) in response to a lower exposure setting (e.g., indicating outdoor illumination), the standard reference set's daylight references (e.g., D50, D65 and D75) are weighted more than the fluorescent references and incandescent references (e.g., U30 and TL84); and (b) conversely, in response to a higher exposure setting, the fluorescent references are weighted more than the daylight references. Such weighting is relatively effective if the digital image is captured by the camera under outdoor sunny illumination, and if the fluorescent illumination has lower color temperature than daylight. However, such weighting is less effective: (a) if the digital image is captured by the camera under darker outdoor illumination, especially when the camera's exposure setting is more suitable for indoor illumination; or (b) if the fluorescent illumination has a relatively high color temperature (e.g., 5000K or 6500K), so that color temperature fails to distinguish the fluorescent references from the daylight references. For example, if the digital image includes a relatively large amount of green color (e.g., from grass and foliage) captured by the camera under darker outdoor illumination, then such weighting is relatively ineffective, and AWB may improperly adjust the digital image by: (a) neutralizing such green color in the digital image; and (b) creating a reddish or bluish cast in the digital image.

SUMMARY

In response to an image, a likelihood of flicker within the image is estimated. In response to the estimated likelihood, references are selected from among first and second sets of references. The first set of references are responsive to a first set of reference images captured under particular illumination. The second set of references are responsive to a second set of reference images captured under fluorescent illumination. In response to the selected references, one or more gains are generated for enhancing white balance of the image.

DETAILED DESCRIPTION

Figure 1:
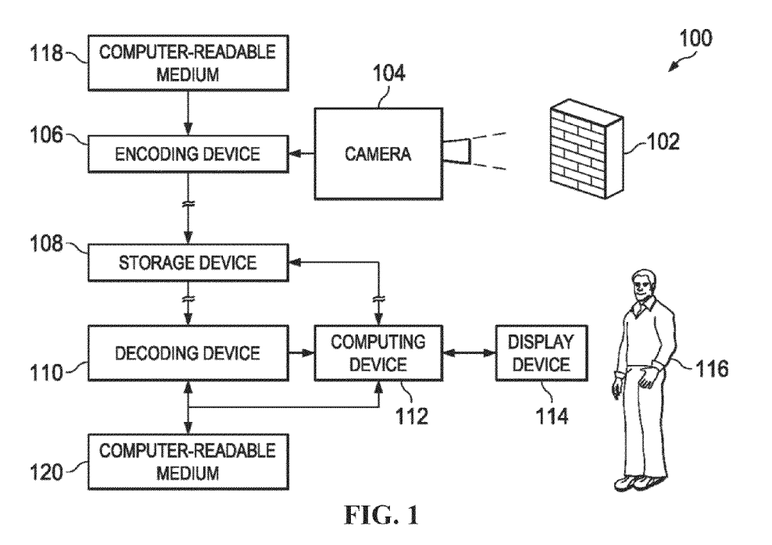
FIG. 1 is a block diagram of an information handling system of the illustrative embodiments.

FIG. 1 is a block diagram of an information handling system (e.g., one or more computers and/or other electronics devices, such as battery-powered mobile smartphones), indicated generally at 100, of the illustrative embodiments. In the example of FIG. 1, a scene (e.g., including a physical object 102 and its surrounding foreground and background) is viewed by a camera 104 (e.g., imaging sensor), which: (a) captures and digitizes images of such views; and (b) outputs a video sequence of such digitized (or "digital") images to an encoding device 106.

The encoding device 106: (a) receives the video sequence from the camera 104; (b) encodes the video sequence into a binary logic bit stream; and (c) outputs the bit stream to a storage device 108, which receives and stores the bit stream. A decoding device 110: (a) reads the bit stream from the storage device 108; (b) in response thereto, decodes the bit stream into the video sequence; and (c) outputs the video sequence to a computing device 112.

The computing device 112: (a) receives the video sequence from the decoding device 110 (e.g., automatically, or in response to a command from a display device 114, such as a command that a user 116 specifies via a touchscreen of the display device 114); and (b) optionally, outputs the video sequence to the display device 114 for display to the user 116. Also, the computing device 112 automatically: (a) performs various AWB operations for enhancing the video sequence's images, so that such enhanced images are optionally displayable to the user 116 by the display device 114; and (b) writes such enhanced images for storage into the storage device 108.

Optionally, the display device 114: (a) receives the video sequence of such enhanced images from the computing device 112 (e.g., automatically, or in response to a command that the user 116 specifies via the touchscreen of the display device 114); and (b) in response thereto, displays the video sequence of such enhanced images (e.g., such enhanced images of the object 102 and its surrounding foreground and background), which are viewable by the user 116. The display device 114 is any suitable display device that includes a display screen whose optical components enable viewing by the user 116, such as a suitable plasma display screen, liquid crystal display ("LCD") screen, or light emitting diode ("LED") display screen.

The encoding device 106 performs its operations in response to instructions of computer-readable programs, which are stored on a computer-readable medium 118 (e.g., hard disk drive, nonvolatile flash memory card, and/or other storage device). Also, the computer-readable medium 118 stores a database of information for operations of the encoding device 106. Similarly, the decoding device 110 and the computing device 112 perform their operations in response to instructions of computer-readable programs, which are stored on a computer-readable medium 120. Also, the computer-readable medium 120 stores a database of information for operations of the decoding device 110 and the computing device 112.

The system 100 includes various electronic circuitry components for performing the system 100 operations, implemented in a suitable combination of software, firmware and hardware, such as one or more digital signal processors ("DSPs"), microprocessors, discrete logic devices, application specific integrated circuits ("ASICs"), and field-programmable gate arrays ("FPGAs"). In one embodiment: (a) a first electronics device includes the camera 104, the encoding device 106, and the computer-readable medium 118, which are housed integrally with one another; and (b) a second electronics device includes the decoding device 110, the computing device 112, the display device 114 and the computer-readable medium 120, which are housed integrally with one another.

In an alternative embodiment: (a) the encoding device 106 outputs the bit stream directly to the decoding device 110 via a network, such as a mobile (e.g., cellular) telephone network, a landline telephone network, and/or a computer network (e.g., Ethernet, Internet or intranet); and (b) accordingly, the decoding device 110 receives and processes the bit stream directly from the encoding device 106 substantially in real-time. In such alternative embodiment, the storage device 108 either: (a) concurrently receives (in parallel with the decoding device 110) and stores the bit stream from the encoding device 106; or (b) is absent from the system 100.

Figure 2:
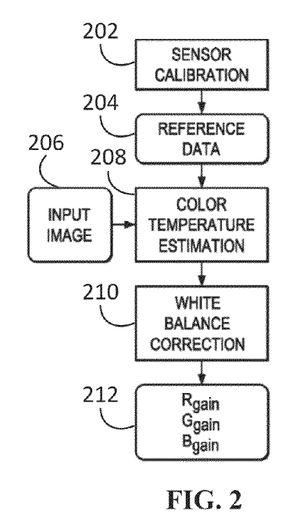
FIG. 2 is an information flow diagram of an operation of a computing device of the system of FIG. 1 for automatically performing color temperature estimation and white balance correction.

FIG. 2 is an information flow diagram of an operation of the computing device 112 for automatically performing color temperature estimation and white balance correction. At a step 202, the computing device 112 performs a sensor calibration of the camera 104. In performing the sensor calibration, the computing device 112 receives sets of reference images (e.g., color checker images) that are captured by the camera 104 under controlled lighting conditions (e.g., captured by the camera 104 in a light box under a variety of controlled color temperatures), including: (a) a first set of reference images that are captured by the camera 104 under a variety of standard illumination for daylight and incandescent, which closely resemble CIE standard illumination (e.g., scientific light bulbs for U30, D50, D65 and D75); and (b) a second set of reference images that are captured by the camera 104 under a variety of commonly used fluorescent illumination whose CRI typically ranges from 60 to 85 (e.g., cool white fluorescent and warm white fluorescent). In one example, the first set of reference images also includes images that are captured by the camera 104 under fluorescent illumination (e.g., TL84) that obeys the same parametric model as other CIE standard illumination.

Also, in performing the sensor calibration, the computing device 112 determines R, G, B, Cb/Y and Cr/Y for each gray patch of each reference image. Further, in performing the sensor calibration, the computing device 112 computes a two-dimensional ("2D") histogram of each reference image in the Cb/Y-Cr/Y space by: (a) quantizing the Cb/Y into N (e.g., N=35) bins, and counting a number of blocks or pixels within each Cb/Y bin; and (b) quantizing the Cr/Y into M (e.g., M=32) bins, and counting a number of blocks or pixels within each Cr/Y bin. Moreover, in performing the sensor calibration, the computing device 112 generates a respective set of reference data files 204 (e.g., K gray reference values) in response to each set of reference images, including: (a) a first set of reference data files ("standard references") responsive to the first set of reference images, which were captured by the camera 104 under the variety of standard illumination; and (b) a second set of reference data files ("additional fluorescent references") responsive to the second set of reference images, which were captured by the camera 104 under the variety of fluorescent illumination.

The computing device 112 writes the generated sets of reference data files 204 for storage in the computer-readable medium 120. In response to the reference data files 204, the computing device 112 enhances a received image 206 (e.g., within the video sequence) by performing color temperature estimation at a step 208 and white balance correction at a step 210 to generate an $R_{gain}$, $G_{gain}$ and $B_{gain}$ 212 for its rendering of the image 206 on the display device 114.

Figure 3A:
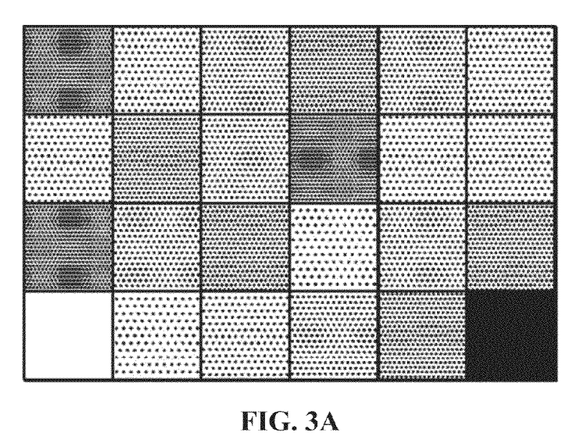
FIG. 3A is an example reference image for a sensor calibration step of FIG. 2.
Figure 3B:
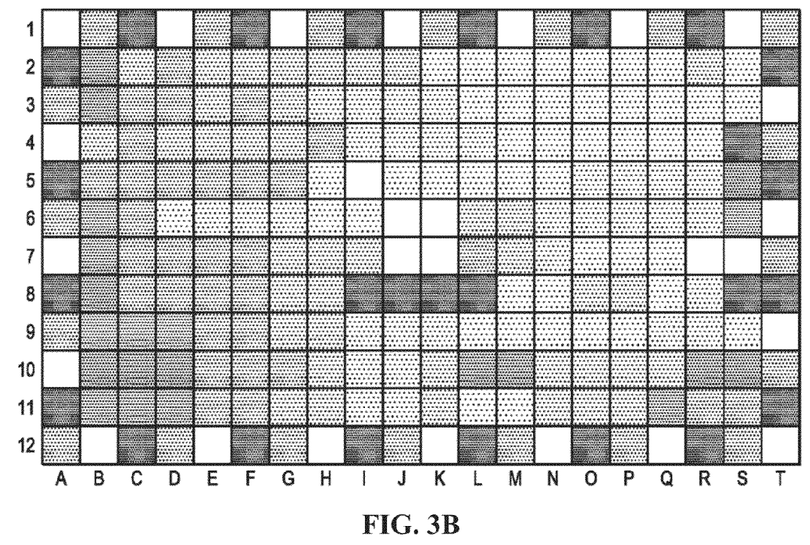
FIG. 3B is another example reference image for the sensor calibration step.

FIG. 3A is an example reference image for the sensor calibration step 202 (FIG. 2). FIG. 3B is another example reference image for the sensor calibration step 202. Any images with collections of popular object colors may be used as reference images for the sensor calibration step 202, such as a conventional Macbeth color checker (FIG. 3A) or color checker semi gloss ("SG") (FIG. 3B). For example, a bottom row of the Macbeth color checker (FIG. 3A) includes six patches with different shades of gray, numbered 1 to 6 from left to right. At the sensor calibration step 202, the computing device 112 performs a modified gray reference scoring operation, which uses only the four middle shades of gray (patches 2, 3, 4 and 5), because: (a) the white shade (patch 1) may cause saturation issues; and (b) the black shade (patch 6) may cause relatively large quantization errors.

Figure 4:
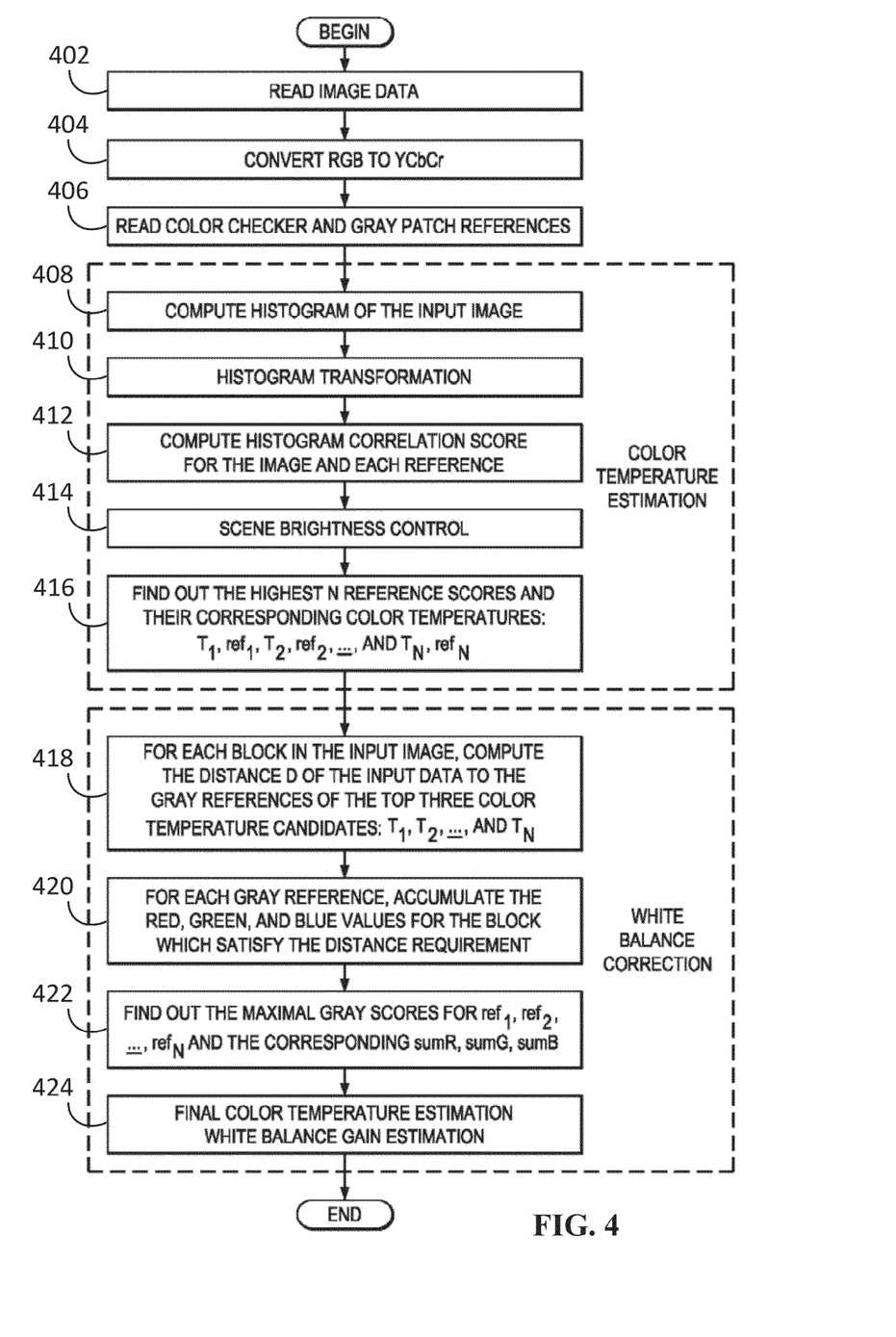
FIG. 4 is a flowchart of color temperature estimation and white balance correction steps of FIG. 2.

FIG. 4 is a flowchart of the color temperature estimation and white balance correction steps 208 and 210 (FIG. 2), which the computing device 112 performs for its rendering of the image 206 on the display device 114. At a step 402, the computing device 112 receives the image 206 (FIG. 2) to be enhanced by the color temperature estimation and white balance correction. At a next step 404, the computing device 112 preprocesses data of the image 206 (e.g., down-sampling such data from 2592×1944 pixels to 128×36 pixels by block averaging) and transforms such data from red-green-blue ("RGB") space into a chromaticity space (e.g., into YCbCr space, where chromaticity Cb and Cr are optionally normalized by luminance Y). In one example:

$Y=0.299R+0.587G+0.114B$ $Cb/Y=256(-0.1726R-0.3388G+0.5114B)/Y$ $Cr/Y=256(0.5114R-0.4283G-0.0832B)/Y$ (1)

At a next step 406, the computing device 112: (a) performs a reference selection operation, in which the computing device 112 selects (from among the reference data files 204) the standard references and/or the additional fluorescent references to be used for the color temperature estimation and white balance correction ("selected references"); and (b) reads the selected references from the computer-readable medium 120.

Figure 5:
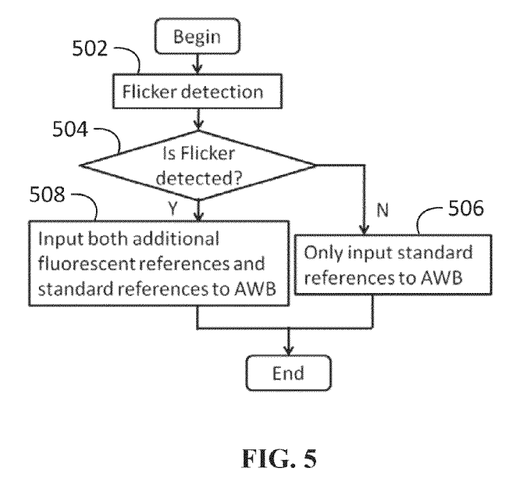
FIG. 5 is a flowchart of a reference selection operation.

FIG. 5 is a flowchart of the reference selection operation of the step 406. At a step 502 ("flicker detection"), the computing device 112 analyzes the image 206 (e.g., within the video sequence) to detect flicker for estimating a likelihood that the image 206 was captured by the camera 104 under fluorescent illumination ("likelihood of flicker"). Typically, fluorescent lamps exhibit a periodic variation in brightness ("flicker") caused by rapid fluctuations in voltage of a power supply.

For example, if the camera 104 is an embedded camera system (e.g., mobile camera) having an electronic rolling shutter, then the image 206 (e.g., within the video sequence) may show an artifact of flicker under such fluorescent illumination. At the step 502, such artifact is detectable by the computing device 112 in its analysis (for all possible frequencies) of the image 206 to estimate the likelihood of flicker. In one embodiment, to improve the reliability of the flicker detection at the step 502, the computing device 112 analyzes multiple images (including, but not limited to, the image 206) within the video sequence and applies temporal filtering to avoid erroneous instantaneous estimation.

At a next step 504, the computing device 112 determines whether the likelihood of flicker exceeds a threshold. In response to the computing device 112 determining (at the step 504) that the likelihood of flicker does not exceed the threshold (e.g., if the likelihood of flicker indicates that the image 206 was likely captured by the camera 104 under standard illumination), the operation continues from the step 504 to a step 506. At the step 506, the computing device 112 selects only the standard references to be used as the selected references for the color temperature estimation and white balance correction, so that the computing device 112 reads only the standard references from the computer-readable medium 120 at the step 406 (FIG. 4). In that manner, the additional fluorescent references do not interfere with the computing device 112 rendering of green color (e.g., from grass and foliage) within the image 206 on the display device 114, in a situation where the image 206 was captured by the camera 104 under standard illumination.

Conversely, in response to the computing device 112 determining (at the step 504) that the likelihood of flicker exceeds the threshold (e.g., if the likelihood of flicker indicates that the image 206 was likely captured by the camera 104 under indoor fluorescent illumination), the operation continues from the step 504 to a step 508. At the step 508, the computing device 112: (a) performs operations to reduce the artifact of flicker within the image 206 (e.g., by suitably modifying the image 206); (b) selects the standard references and the additional fluorescent references to be used as the selected references for the color temperature estimation and white balance correction, so that the computing device 112 reads the standard references and the additional fluorescent references from the computer-readable medium 120 at the step 406 (FIG. 4); and (c) in response to the likelihood of flicker, suitably weights those selected references for the color temperature estimation and white balance correction. Accordingly: (a) as the likelihood of flicker decreases, the computing device 112 increases its weighting of the standard references and reduces its weighting of the additional fluorescent references; and (b) as the likelihood of flicker increases, the computing device 112 reduces its weighting of the standard references and increases its weighting of the additional fluorescent references.

Figure 6A:
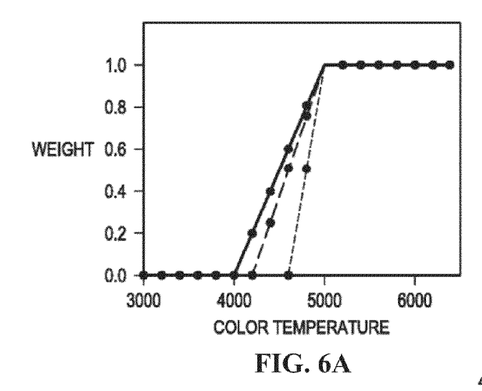
FIG. 6A is a graph of a weight function for a scene brightness control step of FIG. 4.
Figure 6B:
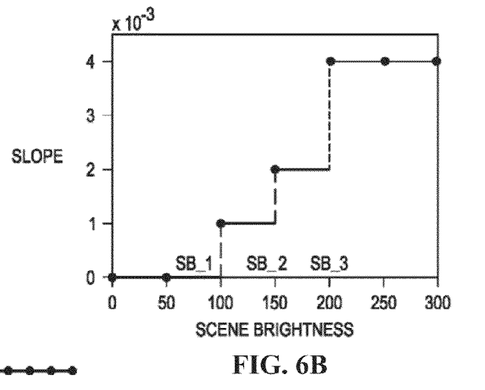
FIG. 6B is a graph of a first example slope function for the scene brightness control step.
Figure 6C:
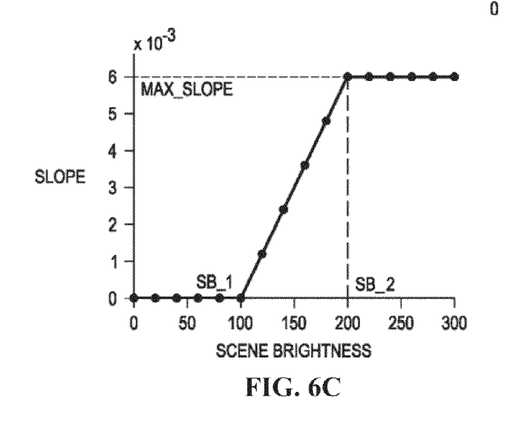
FIG. 6C is a graph of a second example slope function, which implements a continuous slope for improving smoothness.
Figure 7:
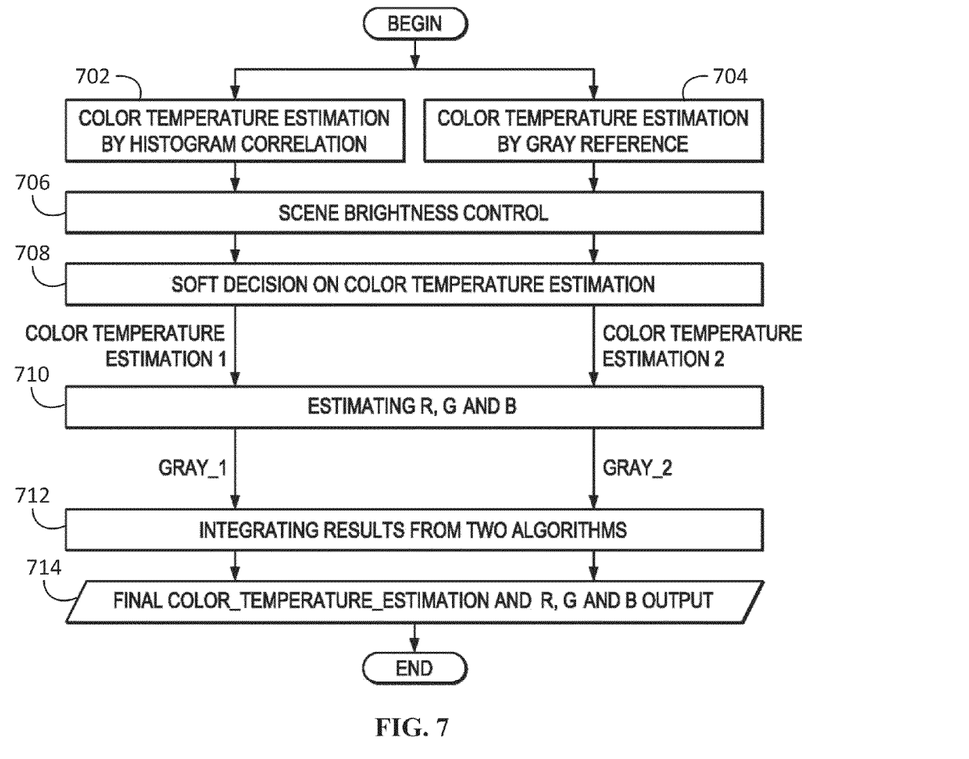
FIG. 7 is an information flow diagram of additional components of the color temperature estimation and white balance correction steps of FIG. 2.

After the reference selection operation of the step 406, the computing device 112 performs (in response to the selected references) the color temperature estimation and white balance correction, in accordance with any suitable reference-based AWB technique. By performing the reference selection operation of the step 406, the computing device 112 improves accuracy of the color temperature estimation and white balance correction for its rendering of the image 206 on the display device 114, in both: (a) a situation where the image 206 was likely captured by the camera 104 under indoor fluorescent illumination; and (b) a situation where the image 206 was likely captured by the camera 104 under standard (e.g., outdoor) illumination, even if the image 206 includes a relatively large amount of green color (e.g., from grass and foliage). FIGS. 4, 6 and 7 show an example reference-based AWB technique for the color temperature estimation and white balance correction.

Accordingly, after the step 406, the operation continues to steps 408 through 416, at which the computing device 112 computes the color temperature estimation. In an alternative embodiment, an order of the steps 408 through 416 is different from the order shown in FIG. 4. At the step 408, the computing device 112 computes a 2D histogram of the image 206 in the Cb/Y-Cr/Y space, similar to how the computing device 112 computed the 2D histogram of each reference image.

At the step 410, the computing device 112 transforms the 2D histogram of the image 206 into a canonical form to reduce a weighting of dominate object color. In one embodiment, the computing device 112 performs such transformation by: (a) thresholding the 2D histogram of the image 206 as shown in equation (2); and (b) optionally, normalizing the 2D histogram of the image 206 as shown in equation (3).

$$Hist(i, j) = \begin{cases} Hist(i, j), & \text{if } Hist(i, j) \le T_{hist} \\ T_{hist}, & \text{if } Hist(i, j) > T_{hist} \end{cases}$$ (2)

$$Hist(i, j) \leftarrow \frac{Hist(i, j) \cdot C}{\sum_i \sum_j Hist(i, j)}$$ (3)

$T_{hist}$ is a maximal allowed histogram value. Scalar C ensures that a sum of the 2D histograms for all received images is equal to C.

At the step 412, the computing device 112 computes a correlation score Corr(i) of each selected reference i as shown in equation (4), $$Corr(i) = \frac{\sum_m \sum_n \text{Hist\_ref}(m, n, i) \cdot \text{Hist\_img}(m, n)}{\text{StdDev\_ref} \cdot \text{StdDev\_img}}, \quad (4)$$

$$i = 1, 2, \ldots, \text{num\_of\_ref}$$

where num_of_ref is a total number of the selected references for color temperature estimation, Hist_ref(m,n,i) is the 2D histogram of the selected reference i, Hist_img(m,n) is the 2D histogram of the image 206, and the computing device 112 computes a standard deviation StdDev_x as shown in equation (5):

$$\text{StdDev\_x} = \sqrt{\frac{1}{M \cdot N} \sum_{n=1}^{N} \sum_{m=1}^{M} \text{Hist\_x}(m, n)^2}, \quad x = \text{ref or img} \quad (5)$$

where x denotes either the applicable reference image ("ref") or the received image 206 ("img"). In a first example, the computing device 112 computes StdDev_x after removing the mean. In a second example, the computing device 112 computes StdDev_x without removing the mean.

At the step 414, the computing device 112 performs scene brightness control by computing respective weights for applying to the correlation scores Corr(i) of the selected references, in response to an estimation of scene brightness under which the image 206 was captured by the camera 104. For example, if the image 206 was captured by the camera 104 under outdoor sunny illumination, then selected references whose color temperatures are between 4000K and 5000K might be confused with object colors (e.g., green from grass and foliage), even though such color temperatures are less likely under outdoor sunny illumination. Accordingly, by performing the scene brightness control step 414, the computing device 112 can reduce weighting of selected references whose color temperatures are less likely within the image 206.

For the scene brightness control step 414, the computing device 112 estimates the scene brightness under which the image 206 was captured by the camera 104. Such estimation is a reverse of an auto-exposure operation (e.g., recovering a luminance level of the image 206 before the auto-exposure operation is applied to it). One embodiment of such estimation is shown in equation (6):

$$\text{Scene\_Brightness} = \frac{K \cdot \text{AverageY}}{\frac{\text{Analog\_gain}}{\text{Analog\_gain\_divider}} \cdot \frac{\text{Digital\_gain}}{\text{Digital\_gain\_divider}} \cdot \text{Exposure\_time}} \quad (6)$$

where K is a scalar, and where:

$$\text{AverageY} = \frac{1}{P \cdot Q} \sum_{i=1}^{P} \sum_{j=1}^{Q} Y(i, j), \quad (7)$$

where: (a) P and Q are a height and width of the image 206, respectively; (b) Y is a luminance of the image 206; and (c) Analog_gain, Analog_gain_divider, Digital_gain, Digital_gain_divider, and Exposure_time are exposure information of the image 206.

At the scene brightness control step 414, the computing device 112 computes respective weights for applying to the correlation scores Corr(i) of the selected references, in response to the estimated scene brightness, so that weight=f (color temperature, slope), where slope=f(scene brightness). FIG. 6A is a graph of a weight function for the scene brightness control step 414. Referring to FIG. 6A, the computing device 112 gradually reduces (e.g., from 1 to 0) weights of selected references whose color temperatures are between $T_2$ (e.g., 5000K) and $T_1$ (e.g., 4000K), as shown in equation (8), $$\text{Weight} = \begin{cases} 1, & \text{if color\_temperature} > T_2 \\ 0, & \text{if colortemperature} < T_1 \\ \text{slope} * \left(\frac{\text{color\_temperature} - 4000}\right), & \text{else} \end{cases} \quad (8)$$

where slope is a function of the estimated scene brightness, as shown in equation (9).

$$\text{Slope} = \begin{cases} 0, & \text{if Scene\_Brightness} < SB_1 \\ S_1, & \text{if } SB_2 > \text{Scene\_Brightness} \geq SB_1 \\ S_2, & \text{if } SB_3 > \text{Scene\_Brightness} \geq SB_2 \\ S_3, & \text{else} \end{cases} \quad (9)$$

In the illustrative embodiment, $$S_1 = \frac{1}{5000 - 4000}, S_2 = \frac{1}{5000 - 4500}, \text{ and } S_3 = \frac{1}{5000 - 4750}.$$

$SB_1$, $SB_2$ and $SB_3$ are tuned in response to the auto-exposure operation.

FIG. 6B is a graph of a first example slope function for the scene brightness control step 414. FIG. 6C is a graph of a second example slope function, which implements a continuous slope for improving smoothness.

According to one embodiment, in response to the estimated scene brightness of the image 206 being greater than a threshold (e.g., 42.0), the computing device 112 disables selected references whose color temperatures are below a particular level (e.g., 4500K), by setting weights of those references to zero. However, in such embodiment: (a) if the estimated scene brightness is near such threshold, then AWB gains might transition abruptly and cause occasional color shift; and (b) the step weight function might cause insufficient correction or over-correction.

At the step 416, the computing device 112: (a) adjusts each selected reference's correlation score Corr(i) by multiplying it with such reference's respective weight (which the computing device 112 computed at the scene brightness control step 414); and (b) sorts the adjusted correlation scores in descending order, so that the highest N adjusted correlation scores ("highest N reference scores") are denoted as Corr(1) through Corr(N). Further, at the step 416, the computing device 112 identifies: (a) the top N selected references refs through $\text{ref}_N$ whose correlation scores are Corr(1) through Corr(N), respectively; and (b) red ("R"), green ("G") and blue ("B") values of their corresponding color temperatures $T_1$ through $T_N$, respectively, which are the top N color temperature candidates.

In an alternative embodiment, for each selected reference, the computing device 112 counts a number of blocks that fall within a circle having a predefined radius R. The radius R may be different for each selected reference. In such alternative embodiment, a top color temperature candidate is the selected reference for which such counted number is greatest. For each selected reference, the computing device 112 may use multiple gray references.

After the steps 408 through 416, the operation continues to steps 418 through 424, at which the computing device 112 estimates $R_{gain}$, $G_{gain}$ and $B_{gain}$ for white balance correction, so that the computing device 112 identifies AWB regions and neutralizes them to gray. In an alternative embodiment, an order of the steps 418 through 424 is different from the order shown in FIG. 4.

For each block in the image 206, and for each gray reference of the top N color temperature candidates $T_1$ through $T_N$, the computing device 112: (a) at the step 418, computes a distance D of such block's data to such gray reference; and (b) at the step 420, if such distance D satisfies a distance requirement (e.g., if such distance D is less than a predefined distance), designates such block as an AWB region, and identifies such block's red ("R"), green ("G") and blue ("B") values. At the step 422, the computing device 112 identifies: (a) maximal gray reference scores for the top N selected references $ref_1$ through $ref_N$; and (b) corresponding sumR, sumG and sumB.

Further, as shown in equations (10) and (11), the computing device 112 computes averages of sumR, sumG and sumB, weighted by their adjusted correlation scores.

$$\text{sumR\_all} = \sum_{i=1}^{N} \alpha_i \cdot sumR(i, g_i) \quad (10)$$

$$\text{sumG\_all} = \sum_{i=1}^{N} \alpha_i \cdot sumG(i, g_i)$$

$$\text{sumB\_all} = \sum_{i=1}^{N} \alpha_i \cdot sumB(i, g_i)$$

$$\alpha_i = \frac{Corr(i)}{\sum_{j=1}^{N} Corr(j)}, i = 1, 2, \ldots, N \quad (11)$$

This weighted average procedure improves stability of color temperature estimation and improves AWB performance for images with dominate object color.

At the step 424, the computing device 112 computes the final color temperature estimation $T_{final}$ as shown in equation (12):

$$T_{final} = \sum_{i=1}^{N} \alpha_i \cdot T_i, \quad (12)$$

Further, at the step 424, the computing device 112 computes the final white balance gains $R_{gain}$, $G_{gain}$ and $B_{gain}$ for adjusting red ("R"), green ("G") and blue ("B") colors, respectively, in rendering of the image 206 on the display device 114. For its rendering of the image 206 on the display device 114, the computing device 112 adjusts such colors by multiplying their channels with such gains, respectively. After such adjustment, sumR_all, sumG_all and sumB_all are substantially equalized.

In one embodiment, the computing device 112 computes $R_{gain}$, $G_{gain}$ and $B_{gain}$ in a manner that keeps sumG_all unchanged, while making sumR_all and sumB_all substantially equal to sumG_all. In another embodiment, as shown in equation (13), the computing device 112 computes $R_{gain}$, $G_{gain}$ and $B_{gain}$ in a manner that: (a) keeps a maximum of sumR_all, sumG_all and sumB_all unchanged, while making the other two substantially equal to such maximum; and (b) ensures that each of $R_{gain}$, $G_{gain}$ and $B_{gain}$ is at least 1.0.

$$R_{gain} = \frac{\max\{\text{sumR\_all}, \text{sumG\_all}, \text{sumB\_all}\}}{\text{sumR\_all}} \quad (13)$$

$$G_{gain} = \frac{\max\{\text{sumR\_all}, \text{sumG\_all}, \text{sumB\_all}\}}{\text{sumG\_all}}$$

$$B_{gain} = \frac{\max\{\text{sumR\_all}, \text{sumG\_all}, \text{sumB\_all}\}}{\text{sumB\_all}}.$$

In one example, for its rendering of the image 206 on the display device 114, the computing device 112 implements a von Kries model as shown in equation (14) to individually scale the red ("R"), green ("G") and blue ("B") colors of the image 206 in response to $R_{gain}$, $G_{gain}$ and $B_{gain}$, respectively:

$$\begin{bmatrix} R_{adapt} \\ G_{adapt} \\ B_{adapt} \end{bmatrix} = \begin{bmatrix} R_{gain} & 0 & 0 \\ 0 & G_{gain} & 0 \\ 0 & 0 & B_{gain} \end{bmatrix} \begin{bmatrix} R_{input} \\ G_{input} \\ B_{input} \end{bmatrix} \quad (14)$$

If Corr(1)=0, so that the maximal correlation score is zero, then the computing device 112 performs a gray world technique to estimate AWB gains. If Corr(1)<Corr_Low_Threshold, then the computing device 112 estimates color temperature in response to the estimated scene brightness. If Corr(1)≠0 and (sumR_all=0 or sumG_all=0 or sumB_all=0), so that AWB regions are not found, then the computing device 112 computes $R_{gain}$, $G_{gain}$ and $B_{gain}$ in response to red ("R"), green ("G") and blue ("B") values of $T_1$ through $T_N$, which are discussed hereinabove in connection with the step 416.

By performing the color temperature estimation and white balance correction as discussed hereinabove in connection with FIGS. 4, 5 and 6, the computing device 112 achieves: (a) improved performance in cases where the image 206 has dominant object colors and/or lack of gray; (b) improved robustness of color temperature estimation for different versions of the image 206; (c) improved stability of color temperature estimation and white balance correction between the image 206 and other consecutive images (having similar content) within the video sequence; (d) easier performance of the sensor calibration step 202 (FIG. 2); and (e) more computational efficiency and real-time execution.

In one embodiment, the camera 104 and the computing device 112 are housed integrally with one another. In another embodiment, the color temperature estimation and white balance correction are modified by having the computing device 112: (a) perform two color temperature estimation operations in parallel; (b) perform an enhanced version of the scene brightness control; and/or (c) combine results from two color temperature estimation operations.

FIG. 7 is an information flow diagram of additional components of the color temperature estimation and white balance correction steps 208 and 210 (FIG. 2). As shown in FIG. 7, the color temperature estimation includes two sub-operations, which the computing device 112 performs in parallel, namely: (a) at a step 702, a histogram correlation, in which the computing device 112 computes a respective correlation score for each selected reference; and (b) at a step 704, a modified gray reference scoring, in which the computing device 112 computes a respective gray reference score for each selected reference. In this example, the computing device 112 uses multiple gray references (instead of one gray reference) for each color temperature.

At a next step 706, the computing device 112 performs scene brightness control. At a next step 708, the computing device 112 generates a soft decision on the color temperature estimation by computing: (a) a color temperature estimation 1 ("Color_Temp_Estim_1") in response to the correlation scores from the step 702; and (b) a color temperature estimation 2 ("Color_Temp_Estim_2") in response to the gray reference scores from the step 704.

The computing device 112 computes each of Color_Temp_Estim_1 and Color_Temp_Estim_2 as a color temperature estimation $T_{final}$, as shown in equations (15) and (16):

$$T_{final} = \sum_{i=1}^{P} \alpha_i \cdot \text{Sorted\_T}_i \quad (15)$$

$$\alpha_i = \frac{\text{Sorted\_Score}(i, g_i)}{\sum_{j=1}^{P} \text{Sorted\_Score}(j, g_j)}, i = 1, 2, \ldots, P \quad (16)$$

where: (a) for computing Color_Temp_Estim_1, the Sorted_$T_i$, i=1, 2, ..., N is a list of the color temperatures of the selected references, sorted in descending order of their respective correlation scores; (b) for computing Color_Temp_Estim_2, the Sorted_$T_i$, i=1, 2, ..., N is a list of the color temperatures of the selected references, sorted in descending order of their respective gray reference scores; and (c) N is a total number of the selected references. In the illustrative embodiments, P=3. By generating the soft decision on the color temperature estimation (instead of generating a hard decision in which P=1), the computing device 112 achieves improved stability of white balance correction (e.g., reduces shift in color from a change in white balance correction between consecutive images of similar scenes), which is one of the most challenging problems of white balance correction.

At a next step 710: (a) in response to the correlation scores from the step 702, the computing device 112 computes $\phi\{T, \text{Gains}\}_1$ ("Gray_1"); and (b) in response to the gray reference scores from the step 704, the computing device 112 computes $\phi\{T, \text{Gains}\}_2$ ("Gray_2"). At a next step 712, the computing device 112 integrates the two sets of results to compute the final color temperature estimation and the final white balance gains $R_{gain}$, $G_{gain}$ and $B_{gain}$ 714.

The computing device 112 performs the step 712 according to one of at least two possible two techniques. According to a first technique ("Technique 1"):

$$\phi\{T, \text{Gains}\}_{final} = \begin{cases} \phi\{T, \text{Gains}\}_2, & \text{if max\_score\_2} > Th \\ \phi\{T, \text{Gains}\}_1, & \text{else} \end{cases} \quad (17)$$

where max_score_2 is a maximal one of the gray reference scores from the step 704, and Th is a predefined threshold.

According to a second technique ("Technique 2"):

$$\phi\{T, \text{Gains}\}_{final} = \alpha \cdot \phi\{T, \text{Gains}\}_2 + \beta \cdot \phi\{T, \text{Gains}\}_1, \quad (18)$$

where $$\alpha = \frac{\text{max\_score\_2}}{\text{total\_num\_blocks}},$$

$$\beta = \frac{\text{max\_score\_1}}{1},$$

where max_score_1 is a maximal one of the correlation scores from the step 702, and total_num_blocks is a total number of blocks or pixels in the image 206. In comparison to the Technique 1, the Technique 2 achieves more stability of white balance correction.

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described by way of example, a wide range of alternative embodiments is possible within the scope of the foregoing disclosure.

What is claimed is:

1. A method performed by at least one device for enhancing white balance of an image, the method comprising:
   in response to the image, estimating a likelihood of flicker within the image;
   in response to the estimated likelihood, selecting references from among first and second sets of references, wherein the first set of references are responsive to a first set of reference images captured under particular illumination, and wherein the second set of references are responsive to a second set of reference images captured under fluorescent illumination; and
   in response to the selected references, generating one or more gains for enhancing white balance of the image;
   wherein selecting references from among the first and second sets of references includes: in response to the estimated likelihood being higher than a threshold, selecting both the first and second sets of references; and in response to the estimated likelihood being not higher than the threshold, selecting only the first set of references.

2. The method of claim 1, wherein the likelihood of flicker indicates a likelihood that the image was captured under fluorescent illumination.

3. The method of claim 1, wherein the image is within a video sequence, and wherein estimating the likelihood of flicker within the image includes:
   in response to the image and other images within the video sequence, estimating the likelihood of flicker within the image.

4. The method of claim 1, wherein selecting both the first and second sets of references includes:
   as the estimated likelihood decreases, increasing a weighting of the first set of references, relative to a weighting of the second set of references; and
   as the estimated likelihood increases, increasing the weighting of the second set of references, relative to the weighting of the first set of references.

5. The method of claim 1, wherein the first and second sets of reference images are captured by a sensor, and wherein the image is captured by the sensor.

6. The method of claim 1, wherein generating the one or more gains includes:
   generating respective gains for adjusting red, green and blue colors of the image in rendering of the image on a display device.

7. The method of claim 1, wherein the first set of reference images are captured under a variety of particular illumination, and wherein the second set of reference images are captured under a variety of fluorescent illumination.

8. A system for enhancing white balance of an image, the system comprising:
   a combination of electronic circuitry components for: in response to the image, estimating a likelihood of flicker within the image; in response to the estimated likelihood, selecting references from among first and second sets of references, wherein the first set of references are responsive to a first set of reference images captured under particular illumination, and wherein the second set of references are responsive to a second set of reference images captured under fluorescent illumination; and, in response to the selected references, generating one or more gains for enhancing white balance of the image;
   wherein selecting references from among the first and second sets of references includes: in response to the estimated likelihood being higher than a threshold, selecting both the first and second sets of references; and in response to the estimated likelihood being not higher than the threshold, selecting only the first set of references.

9. The system of claim 8, wherein the likelihood of flicker indicates a likelihood that the image was captured under fluorescent illumination.

10. The system of claim 8, wherein the image is within a video sequence, and wherein estimating the likelihood of flicker within the image includes:
    in response to the image and other images within the video sequence, estimating the likelihood of flicker within the image.

11. The system of claim 8, wherein selecting both the first and second sets of references includes:
    as the estimated likelihood decreases, increasing a weighting of the first set of references, relative to a weighting of the second set of references; and
    as the estimated likelihood increases, increasing the weighting of the second set of references, relative to the weighting of the first set of references.

12. The system of claim 8, wherein the first and second sets of reference images are captured by a sensor, and wherein the image is captured by the sensor.

13. The system of claim 8, wherein generating the one or more gains includes:
    generating respective gains for adjusting red, green and blue colors of the image in rendering of the image on a display device.

14. The system of claim 8, wherein the first set of reference images are captured under a variety of particular illumination, and wherein the second set of reference images are captured under a variety of fluorescent illumination.

15. A computer program product for enhancing white balance of an image, the computer program product comprising:
    a non-transitory tangible computer-readable storage medium; and
    a computer-readable program stored on the non-transitory tangible computer-readable storage medium, wherein the computer-readable program is processable by an information handling system for causing the information handling system to perform operations including: in response to the image, estimating a likelihood of flicker within the image; in response to the estimated likelihood, selecting references from among first and second sets of references, wherein the first set of references are responsive to a first set of reference images captured under particular illumination, and wherein the second set of references are responsive to a second set of reference images captured under fluorescent illumination; and, in response to the selected references, generating one or more gains for enhancing white balance of the image;
    wherein selecting references from among the first and second sets of references includes: in response to the estimated likelihood being higher than a threshold, selecting both the first and second sets of references; and in response to the estimated likelihood being not higher than the threshold, selecting only the first set of references.

16. The computer program product of claim 15, wherein the likelihood of flicker indicates a likelihood that the image was captured under fluorescent illumination.

17. The computer program product of claim 15, wherein the image is within a video sequence, and wherein estimating the likelihood of flicker within the image includes:

in response to the image and other images within the video sequence, estimating the likelihood of flicker within the image.

18. The computer program product of claim 15, wherein selecting both the first and second sets of references includes:
   as the estimated likelihood decreases, increasing a weighting of the first set of references, relative to a weighting of the second set of references; and
   as the estimated likelihood increases, increasing the weighting of the second set of references, relative to the weighting of the first set of references.

19. The computer program product of claim 15, wherein the first and second sets of reference images are captured by a sensor, and wherein the image is captured by the sensor.

20. The computer program product of claim 15, wherein generating the one or more gains includes:
   generating respective gains for adjusting red, green and blue colors of the image in rendering of the image on a display device.

21. The computer program product of claim 15, wherein the first set of reference images are captured under a variety of particular illumination, and wherein the second set of reference images are captured under a variety of fluorescent illumination.

22. A system for enhancing white balance of an image, the system comprising:
   a sensor for capturing: the image and other images within a video sequence; a first set of reference images under a variety of particular illumination; and a second set of reference images under a variety of fluorescent illumination;
   a display device for displaying the image;
   a combination of electronic circuitry components for: generating a first set of references in response to the first set of reference images; generating a second set of references in response to the second set of reference images; in response to the image and the other images within the video sequence, estimating a likelihood of flicker within the image, wherein the likelihood of flicker indicates a likelihood that the image was captured under fluorescent illumination; in response to the estimated likelihood being higher than a threshold, selecting both the first and second sets of references; in response to the estimated likelihood being not higher than the threshold, selecting only the first set of references; and, in response to the selected references, generating respective gains for adjusting colors of the image in rendering of the image on the display device.

23. The system of claim 22, wherein selecting both the first and second sets of references includes:
   as the estimated likelihood decreases, increasing a weighting of the first set of references, relative to a weighting of the second set of references; and
   as the estimated likelihood increases, increasing the weighting of the second set of references, relative to the weighting of the first set of references.

24. The system of claim 22, wherein generating the respective gains includes:
   generating the respective gains for adjusting red, green and blue colors of the image in rendering of the image on the display device.

* * * * *